(12) United States Patent
Loi et al.

(10) Patent No.: US 11,977,190 B2
(45) Date of Patent: May 7, 2024

(54) SCINTILLATOR RADIATION DETECTOR AND CORRESPONDING DOSIMETER

(71) Applicant: STMICROELECTRONICS S.r.l., Agrate Brianza (IT)

(72) Inventors: Sara Loi, Villaputzu (IT); Paolo Crema, Vimercate (IT); Alessandro Freguglia, Milan (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 412 days.

(21) Appl. No.: 16/917,517

(22) Filed: Jun. 30, 2020

(65) Prior Publication Data
US 2021/0003721 A1 Jan. 7, 2021

(30) Foreign Application Priority Data
Jul. 2, 2019 (IT) .......................... 102019000010638

(51) Int. Cl.
*G01T 1/20* (2006.01)
*G01T 1/02* (2006.01)

(52) U.S. Cl.
CPC .......... *G01T 1/20184* (2020.05); *G01T 1/023* (2013.01); *G01T 1/2002* (2013.01); *G01T 1/20187* (2020.05)

(58) Field of Classification Search
CPC ... G01T 1/20184; G01T 1/023; G01T 1/2002; G01T 1/20187
See application file for complete search history.

(56) References Cited

U.S. PATENT DOCUMENTS

| 7,138,633 B1 * | 11/2006 | Rozsa ................... G01T 1/1648 |
| | | 250/361 R |
| 7,193,208 B1 * | 3/2007 | Burr ...................... G01T 1/2985 |
| | | 250/362 |
| 7,372,035 B2 * | 5/2008 | Yokoi ..................... G01T 1/249 |
| | | 250/370.08 |

(Continued)

FOREIGN PATENT DOCUMENTS

| FR | 3 072 783 A1 | 4/2019 |
| JP | 2009121929 A * | 6/2009 |
| WO | 2006/114715 A2 | 11/2006 |

*Primary Examiner* — David P Porta
*Assistant Examiner* — Djura Malevic
(74) *Attorney, Agent, or Firm* — Seed IP Law Group LLP

(57) ABSTRACT

A device such as a dosimeter for detecting ionizing radiation, for example, X-ray radiation, in hospitals or the like. The device includes scintillator material configured to produce light as a result of radiation interacting with the scintillator material, and photoelectric conversion circuitry optically coupled to the scintillator material and configured to produce electrical signals via photoelectric conversion of light produced by the scintillator material. The device includes a plurality of photoelectric converters optically coupled with the scintillator material at spatially separated locations. The plurality of photoelectric converters thus produce respective electrical signals by photoelectric conversion of light produced by the scintillator material as a result of radiation interacting with the scintillator material. Improved energy linearity is thus facilitated while providing more efficient detection over the whole energy spectrum of radiation detected.

20 Claims, 3 Drawing Sheets

(56) References Cited

U.S. PATENT DOCUMENTS

| | | | | |
|---|---|---|---|---|
| 7,622,719 | B2* | 11/2009 | Spahn | H01L 27/14663 250/370.11 |
| 7,626,389 | B2* | 12/2009 | Fiedler | G01R 33/481 324/309 |
| 7,671,339 | B2* | 3/2010 | Shibuya | G01T 1/2985 250/363.04 |
| 8,319,188 | B2* | 11/2012 | Ramsden | G01T 1/1644 250/370.09 |
| 8,461,540 | B2* | 6/2013 | Nakashima | G01T 1/20 250/361 R |
| 8,476,599 | B2* | 7/2013 | Perna | G01T 1/202 250/370.11 |
| 8,481,948 | B2* | 7/2013 | Frach | G01T 1/2002 250/361 R |
| 8,633,445 | B2* | 1/2014 | Star-Lack | A61B 6/5282 250/363.04 |
| 8,809,794 | B2* | 8/2014 | Uchida | G01T 1/2006 250/361 R |
| 8,817,946 | B2* | 8/2014 | Kobayashi | A61B 6/5282 250/366 |
| 9,029,789 | B2* | 5/2015 | Shibuya | G01T 1/2985 250/367 |
| 9,194,959 | B2* | 11/2015 | Schmand | G01T 1/1642 |
| 9,360,563 | B2* | 6/2016 | Perna | G01T 1/2006 |
| 9,535,169 | B2* | 1/2017 | Uchida | G01T 1/2006 |
| 9,599,722 | B2* | 3/2017 | Laurence | G01T 1/1644 |
| 9,599,724 | B2* | 3/2017 | Wieczorek | G01T 1/20183 |
| 9,651,689 | B2* | 5/2017 | Gendotti | G01T 3/06 |
| 9,709,684 | B2* | 7/2017 | Kim | B23K 26/352 |
| 9,784,850 | B2* | 10/2017 | Da Silva Rodrigues | G01T 1/1603 |
| 9,899,113 | B2* | 2/2018 | Nitta | C09K 11/7774 |
| 9,945,967 | B2* | 4/2018 | Yamashita | G01T 1/1644 |
| 9,952,336 | B2* | 4/2018 | Yang | G01T 1/20184 |
| 10,408,952 | B2* | 9/2019 | Crema | H01L 31/085 |
| 10,459,094 | B2* | 10/2019 | Simanovsky | G01T 1/243 |
| 10,466,371 | B2* | 11/2019 | Zhang | A61B 6/037 |
| 10,497,741 | B2* | 12/2019 | Wong | H01L 27/14663 |
| 11,340,359 | B2* | 5/2022 | Herrmann | A61B 6/032 |
| 11,385,362 | B2* | 7/2022 | Furenlid | G01T 1/20182 |
| RE49,174 | E* | 8/2022 | Yang | G01T 1/20184 |
| 11,644,582 | B2* | 5/2023 | Ishii | A61B 6/563 378/62 |
| 2004/0227091 | A1* | 11/2004 | LeBlanc | G01T 1/1642 250/366 |
| 2005/0082491 | A1* | 4/2005 | Seppi | A61B 6/4441 250/370.11 |
| 2006/0071173 | A1* | 4/2006 | Zeman | H01L 27/1469 250/370.11 |
| 2006/0081899 | A1* | 4/2006 | Fritzler | G01T 1/249 257/291 |
| 2006/0151708 | A1* | 7/2006 | Bani-Hashemi | G01T 1/2008 250/370.11 |
| 2007/0040125 | A1* | 2/2007 | Sato | G01T 1/20 257/E31.129 |
| 2007/0263764 | A1* | 11/2007 | Mccallum | G01T 1/2928 250/370.11 |
| 2008/0253507 | A1* | 10/2008 | Levene | G01T 1/20182 378/19 |
| 2009/0008562 | A1* | 1/2009 | Grazioso | G01T 1/1644 250/363.04 |
| 2009/0032717 | A1* | 2/2009 | Aykac | G01T 1/202 250/366 |
| 2010/0135463 | A1* | 6/2010 | Kang | G01T 1/2018 250/370.11 |
| 2010/0200760 | A1* | 8/2010 | Baeumer | H01L 27/1446 250/366 |
| 2010/0270462 | A1* | 10/2010 | Nelson | G01T 1/20181 250/252.1 |
| 2011/0192982 | A1* | 8/2011 | Henseler | G01T 1/2985 250/362 |
| 2012/0235047 | A1* | 9/2012 | Lewellen | G01T 1/1642 250/366 |
| 2013/0009067 | A1* | 1/2013 | Schmand | G01T 1/1642 250/366 |
| 2013/0056638 | A1* | 3/2013 | Inadama | G01T 1/1644 250/362 |
| 2013/0126743 | A1* | 5/2013 | Iwakiri | A61B 6/4283 250/366 |
| 2013/0153774 | A1* | 6/2013 | Hughes | G01T 1/20182 250/366 |
| 2013/0153776 | A1* | 6/2013 | Wieczorek | G01T 1/20182 250/366 |
| 2013/0299710 | A1* | 11/2013 | Uchida | G01T 1/2006 250/366 |
| 2013/0306876 | A1* | 11/2013 | Uchida | G01T 1/2985 250/366 |
| 2014/0138548 | A1* | 5/2014 | Li | G01T 1/1644 250/366 |
| 2015/0028218 | A1* | 1/2015 | Kataoka | G01T 1/2985 250/367 |
| 2015/0033541 | A1* | 2/2015 | Nitta | G21K 4/00 29/460 |
| 2016/0154121 | A1* | 6/2016 | Luhta | G01T 1/2985 250/366 |
| 2016/0223687 | A1* | 8/2016 | Yamashita | G01T 1/20183 |
| 2016/0223688 | A1* | 8/2016 | Yamashita | G01T 1/1644 |
| 2016/0223707 | A1* | 8/2016 | Allen | G01V 5/06 |
| 2017/0329024 | A1* | 11/2017 | Yang | G01T 1/20187 |
| 2018/0284299 | A1* | 10/2018 | Crema | G01T 1/20188 |
| 2018/0292548 | A1* | 10/2018 | Zhang | G01T 1/2985 |
| 2019/0019837 | A1* | 1/2019 | Wong | G01T 1/20 |
| 2019/0324161 | A1* | 10/2019 | Ota | G01T 1/2985 |
| 2020/0064496 | A1* | 2/2020 | Herrmann | G01T 1/20186 |
| 2021/0003721 | A1* | 1/2021 | Loi | G01T 1/2002 |

* cited by examiner

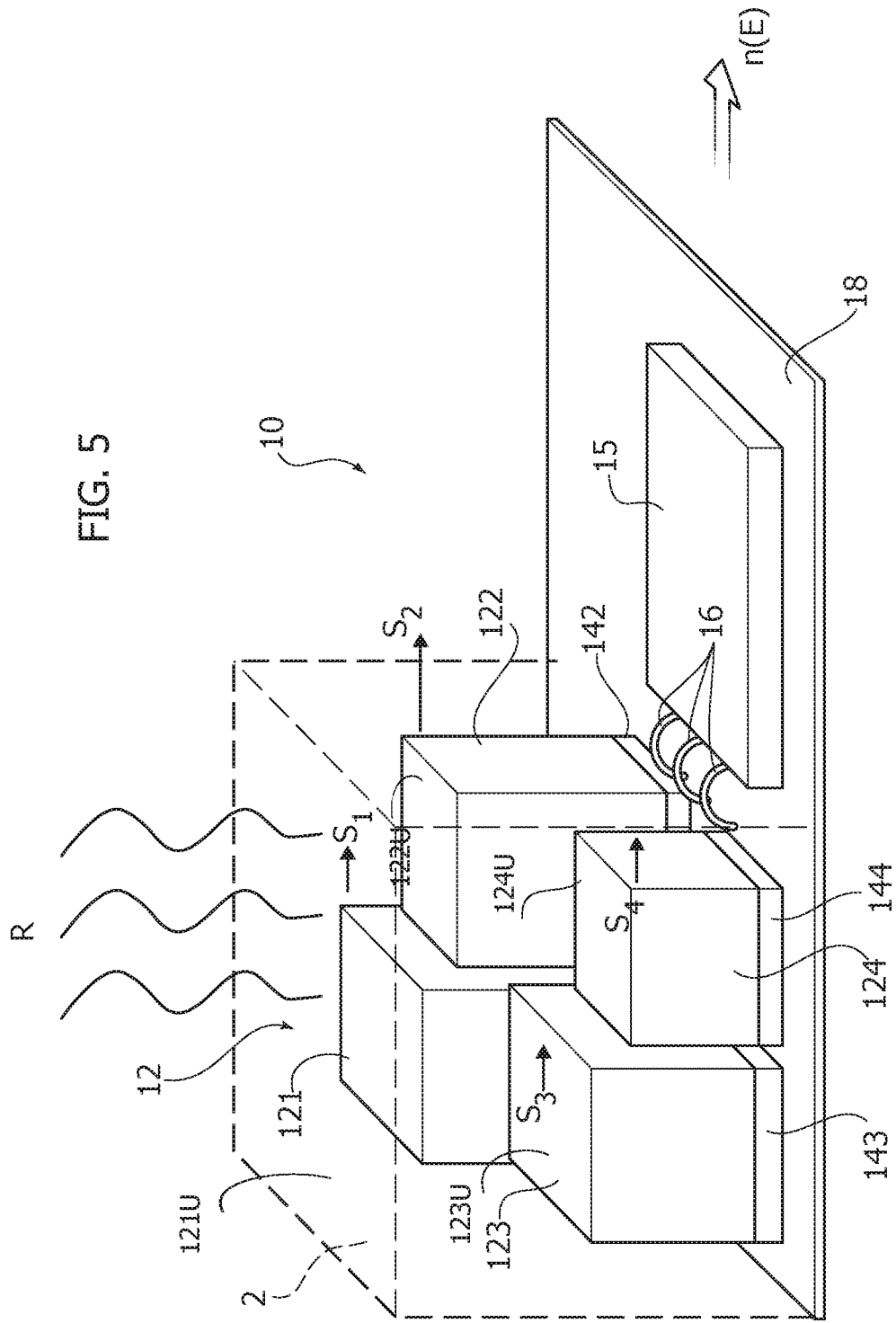

SCINTILLATOR RADIATION DETECTOR AND CORRESPONDING DOSIMETER

BACKGROUND

Technical Field

The description relates to scintillator devices.

Description of the Related Art

Dosimeters are devices capable of detecting ionizing radiation (X rays, for instance).

Dosimeters are currently manufactured, for instance, using thermo-luminescence devices (TLD), which are however affected by an intrinsic drawback related to reading operations which involve operator intervention, which may be expensive and turn out to be time-consuming.

Application of those devices may thus be limited to measurements averaged over time and can hardly be proposed for real time measurements.

Being able to provide electronic, solid-state detectors capable of operating as radiation dosimeters would be a desirable goal to pursue, also in view of possible applications in an Internet-of-Things (IoT) context. In that context, real time measurements would, for instance, facilitate activating warnings as a result of high dose or dose rate values being reached, without waiting for completion of the integration time of the measurement and the time for reading operations.

Scintillator materials/devices can be considered for such applications in view of their capability of facilitating indirect conversion of radiation into electric charge. Scintillator materials/devices are capable of producing, as a result of interaction with radiation propagating through the scintillator material, light (that is photons) which can be eventually converted into electrical charge, and thus electrical signals, via photoelectric converters. Photodetectors such as silicon photomultipliers (SiPMs) may be exemplary of such photoelectric converters.

Scintillator-based dosimeters look promising in comparison with other electronic solutions such as hybrid direct-ion storage devices which are sometimes used for high-end applications and tend to be quite expensive.

Applying scintillator materials/devices to dosimetry is however adversely affected by at least two factors:
- possible different depths of propagation of the radiation within a scintillator material (as a function of a different energy of the radiation) may militate against energy linearity, that is the capability of providing output signals having a substantially linear dependency on the radiation energy; and
- variable detection efficiency over the whole energy spectrum of the radiation detected.

BRIEF SUMMARY

One or more embodiments may be applied, for instance, in "smart" dosimeters for radiation protection (for instance, against X rays) in hospitals and other installations or in RX detectors in equipment for diagnostics in medicine.

One or more embodiments may relate to a corresponding dosimeter.

One or more embodiments may provide a device for radiation dosimetry which is compatible with an Internet-of-Things (IoT) approach.

One or more embodiments may comprise photoelectric converters (silicon photomultipliers or SiPMs, for instance) assembled with scintillator material placed "on top" of them.

One or more embodiments may provide different approaches in order to improve, for instance, energy linearity and detection efficiency.

For instance, a matrix of photoelectric detectors (SiPMs, for instance) can be placed on the vertical walls of a body of scintillator material with the capability of measuring the depth of interaction of radiation in the scintillator. In that way, a correction factor can be calculated for geometrical efficiency by taking into account the relationship to the radiation energy.

Also, a parallel detection chain with optimized scintillator thickness or material (with step-wise or continuous thickness variation, for instance) can be provided, for instance, in order to improve detection efficiency in the energy spectrum.

BRIEF DESCRIPTION OF THE SEVERAL VIEWS OF THE DRAWINGS

One or more embodiments will now be described, by way of example only, with reference to the figures, wherein:

FIG. 5 is a perspective view of a device according to embodiments as described herein.

DETAILED DESCRIPTION

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or materials or other characteristics may be combined in any adequate way in one or more embodiments.

Figure 1:
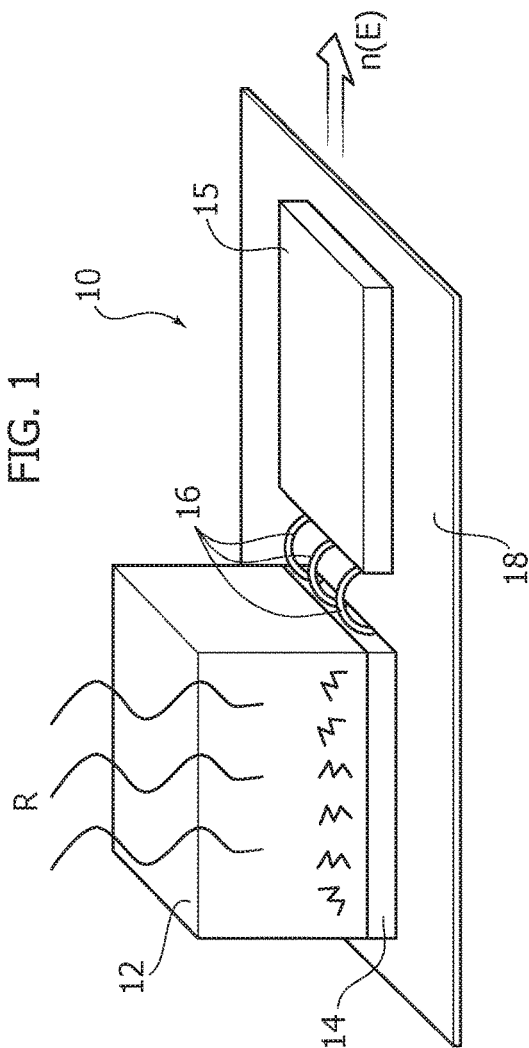
FIG. 1 is a perspective view of a conventional scintillator arrangement.

FIG. 1 is a perspective representation of a scintillator device.

The device 10 as shown in FIG. 1 may comprise a body of scintillator material such as a scintillator crystal 12 exposed to a radiation R.

The radiation R can be represented, for instance, by X rays or other types of ionizing radiations such as a particles, β particles and γ particles or other types emitted by radioactive material or radiation generators or generated by other following physical interaction.

The scintillator material 12 comprises material that exhibits scintillation, namely the property of luminescence when excited by (ionizing) radiation.

The scintillator material 12 may include CsI(Tl), thallium activated, cesium iodide. Other materials exhibiting scintillation are suitable for use in embodiments as discussed in the following.

Such a scintillator material may emit light, for instance infrared and/or visible photons, as a result of interaction with the radiation R.

The photons emitted as a result of scintillation can be received by a photodetector 14, that is a photoelectric converter configured to generate electrical signals of one or more output lines 16 as a result of converting the photons from the scintillator material into electrical signals.

The photoelectric converter 14 may include one or more Silicon PhotoMultipliers (SiPMs) or single-photon avalanche diodes (SPAD) operating in Geiger regime and capable of generating a current pulse when a photon hits a specific SPAD.

Reference to such types of photodetectors is for illustrative purposes only and is not to be construed as limiting the scope of the disclosure. Different types of photodetectors can be considered as alternative or additional embodiments.

For instance, the photoelectric converter 14 can comprise a bi-dimensional planar array of SPADs to provide an output signal which is the sum of the current pulses from the SPADs. A signal can thus be available on the electrical connections 16 between the detector 14 and the substrate 18, which is a function of, for instance, proportional to, the energy of the incident radiation R.

An array of SiPMs 14 can be considered with respective signals for the pixels in the array available in the connections 16, the planar distribution of the radiation R giving fluence and energy in the scintillator 12.

Such an output signal (electric signal) can be forwarded to associated processor circuitry 15, which can be wire bonded or flip chipped to the substrate 18 and be on a same circuit board 18 or hosted in a different package from the detector.

The processing circuitry 15 is configured to process such a signal, in various manners, for instance via software processing, with the possibility of presenting to a user information n(E) indicative of the energy spectrum of the radiation R detected.

The device 10 as shown in FIG. 1 can be incorporated to a portable electronic device such as a mobile phone or the like.

One or more embodiments may be based on the recognition that an arrangement as shown in FIG. 1 may be unable to take into account adequately the depth of interaction of the radiation R with the scintillator material 12.

Also, an arrangement as shown in FIG. 1 may be unable to provide a desirable detection efficiency for different radiation energies which may result in different thicknesses and material choices involved to adequately deposit its energy in the material.

One or more embodiments may address these issues by resorting to embodiments shown in FIGS. 2 to 5.

In FIGS. 2 to 5, parts or elements that are similar to the parts or elements already discussed in connection with FIG. 1 are indicated with like reference symbols. Therefore, a detailed description of these parts or elements will not be repeated in the case of FIGS. 2 to 5 for brevity.

Figure 2:
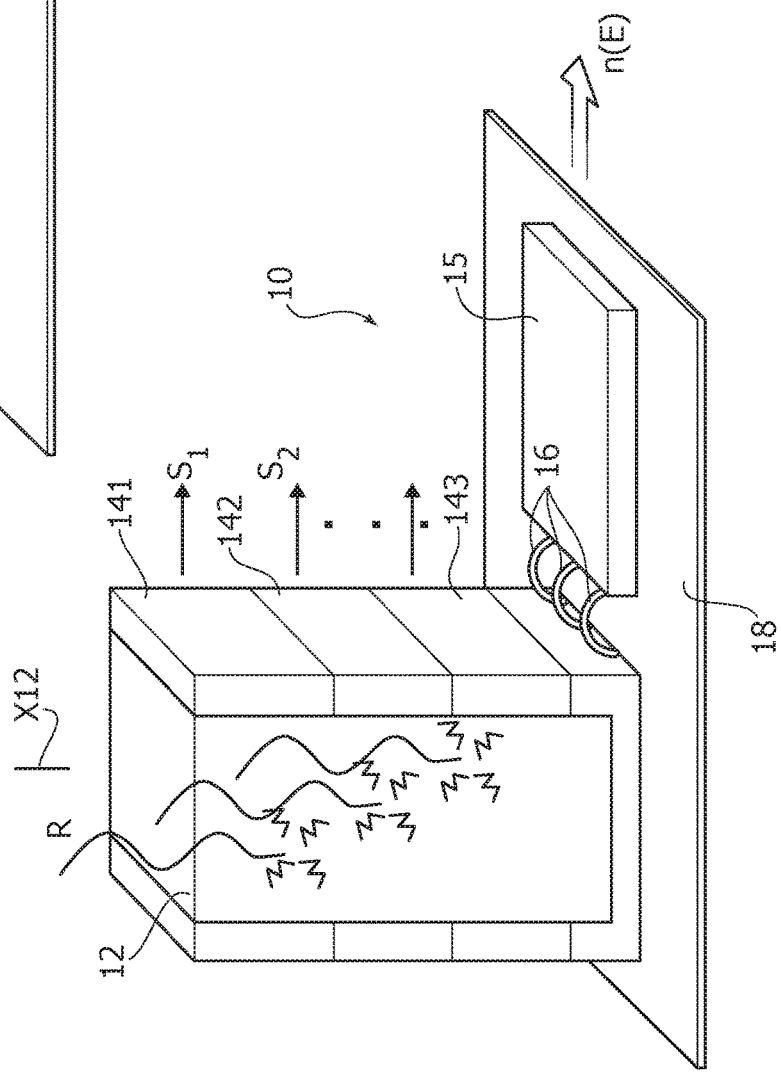
FIG. 2 is a perspective view of a device according to embodiments as described herein.
Figure 4:
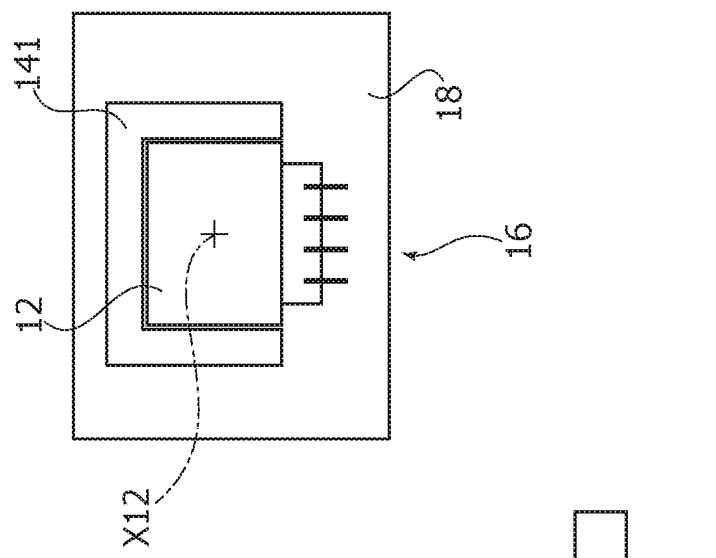
FIG. 4 is a partial plan view in a direction corresponding to line IV of FIG. 3.
Figure 3:
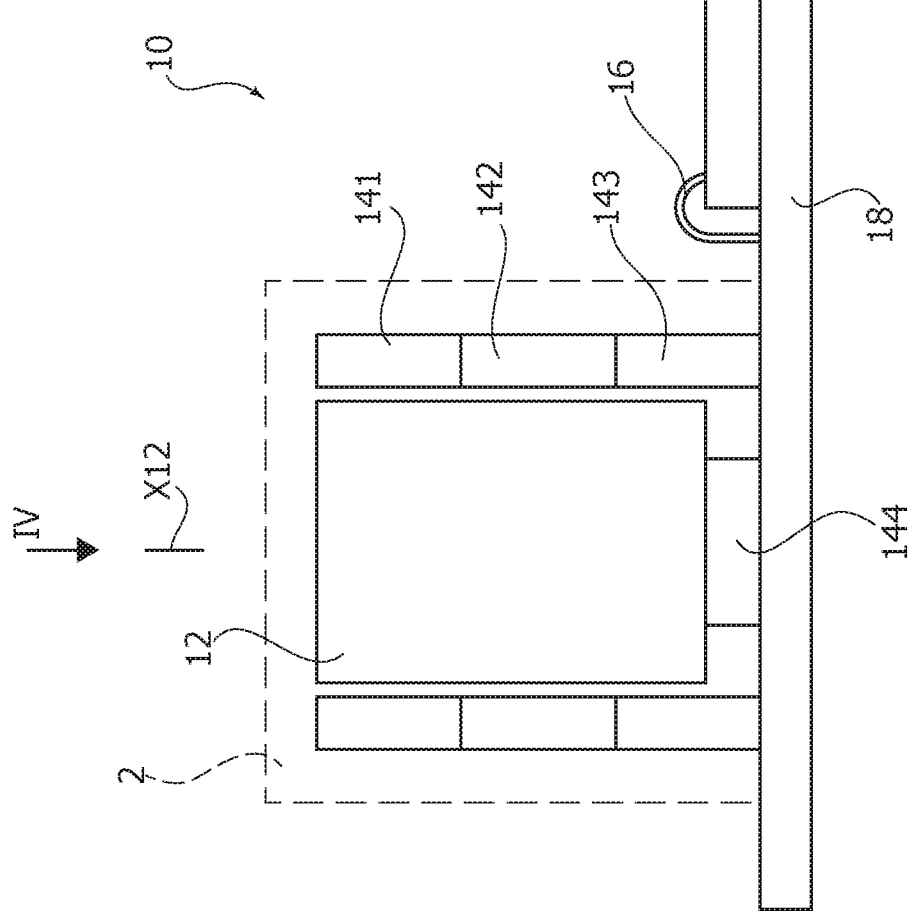
FIG. 3 is a cross-sectional view of a device as shown in FIG. 2.

As shown in FIGS. 2 to 4, one or more embodiments use a scintillator material body 12, for instance prismatic, such as parallelepiped, extending in at least one longitudinal direction X12 in combination with a plurality of photoelectric converters 141, 142, 143 distributed along the length of the scintillator material body 12 in the direction X12.

The signals $S_1, S_2, \ldots$ from these photoelectric converters 141, 142, 143 may be a function of a respective interaction position of the radiation R with the scintillator material 12, for instance, a respective depth of penetration of the radiation R into the scintillator material 12.

These different signals $S_1, S_2, \ldots$ resulting from photoelectric conversion of light produced by scintillation at different locations of the scintillator material body 12 may thus be forwarded towards the processing circuitry 15 with linearity correction processing applied therein to the signals $S_1, S_2, \ldots$ to provide a resulting detection signal n(E), which is a substantially linear function of the energy of the radiation R.

Such linearity correction processing may be of any type, which makes it unnecessary to provide a more detailed description herein. Also, it will be appreciated that one more embodiments may be primarily related to ways of producing the signals $S_1, S_2, \ldots$ rather than to processing thereof, which may be conducted by various means without limiting the scope of the disclosure.

FIGS. 3 and 4 are examples of the possibility of arranging at least one photoelectric converter or an array of photoelectric converters, 144, for instance, at a terminal position of the body of scintillator material 12. For instance, this may be at the "back" or "bottom" end of the body 12 opposed to the "front" or "top" end surface of the body 12 which is predominantly exposed to the radiation R.

For instance, in the case of a device 10 used as a dosimeter, the device may have a "front" or "top" sensing surface configured to be exposed to ionizing radiation R, with the scintillator body 12 having that end surface arranged facing the sensing surface so that light can be produced as a result of ionizing radiation R interacting with the scintillator material 12.

The overall mounting arrangement of FIGS. 3 and 4 may thus be similar to the one shown in FIG. 1, with the (other) photoelectric converters 141, 142, 143 distributed (staggered) along the lateral walls of the scintillator material body 12 along the longitudinal direction X12.

In one or more embodiments the "back" or "bottom" photoelectric converter 144 can be assembled on the substrate 18, via wires or bumps or other suitable connection means, with the scintillator body 12 placed on top of the photoelectric converters or detector 144 and the other "lateral" photoelectric converters 141, 142, 143 assembled vertically (with bumps for instance) along the longitudinal direction X12 of the body 12.

The arrangement of the detector shown herein is thus somewhat reminiscent of the vertical axis chip of an integrated 3-axis magnetometer System in Package (SiP) and similar processes can be used for its fabrication. Glue can be possibly considered for improving scintillator 12 and detector 144 coupling.

The processing circuitry 15 can then be assembled onto the substrate 18.

In one or more embodiments, for instance the lateral photoelectric converters 141, 142, . . . , can be assembled onto the scintillator material body 12 prior to placing the scintillator material body 12 onto the photoelectric converter 144.

FIG. 3 show example embodiments (for simplicity, this representation is provided in FIGS. 3 and 5 only) of embedding the scintillator material body 12 and the photoelectric converters 141, 142, . . . , in a material 2 capable of reflecting the photons, infrared and/or visible light photons, emitted by the scintillator material 12 as a result of interaction with the radiation R.

For instance, the material 2 can be a resin dispensed or molded such as a white-pigmented resin such as resin comprising titanium dioxide.

Such a resin can provide a reflectivity above 90%, possibly near 100%, in the region of the peak of emission of the scintillator material 12. It can also filter environmental light generated outside the device package and/or an additional material, a black resin for instance, may be molded "on top" to protect the overall structure and filter the external light.

For instance, in the case that the scintillator material 12 is a CsI(Tl) crystal, which has an emission peak at a wavelength of 550 nm and a lower wavelength cut-off at 320 nm, reflectivity of titanium dioxide of the material 2 may be above 90% from just above 400 nm in the case of the rutile form and even before in the case of atanase and remains well above 90% in the region of the peak, for instance reference can be made the Full Width at Half Maximum—FWHM.

It will be otherwise appreciated that, as discussed previously, reference to CsI(Tl) as a scintillator material is merely for illustration. Possible alternative choices may include, for instance, CsI(Na) or other alkali halide crystals or inorganic crystals. The choice of the material for the photon-reflective casing 2 may thus be adapted accordingly.

One or more embodiments may resort to arrangements where propagation paths of radiation coming down to different photoelectric converters may extend over different lengths and/or through different scintillator materials.

Such arrangements may involve, for instance, different materials juxtaposed to one another, for instance piled up in a stack and/or, as in the case shown in FIG. 5, arrangements where signals $S_1$, $S_2$, . . . , related to different propagation depths of the radiation X within a scintillator material can be produced by "splitting" the scintillator material 12 into a plurality of portions (bodies) of different lengths—and/or materials—as illustratively shown as 121, 122, 123, 124 in FIG. 5. The plurality of portions (bodies) 121, 122, 123, 124 each have a first surface 121U, 122U, 123U, 124U, respectively, that are distal from the substrate 18. The plurality of portions (bodies) 121, 122, 123, 124 each have a second surface (not shown in FIG. 5) that opposes the first surface 121U, 122U, 123U, 124U, respectively, and is proximal to the substrate 18. In some embodiments, the first surfaces 121U, 122U, 123U, 124U have different distances from the substrate 18. In some embodiments, the plurality of portions (bodies) 121, 122, 123, 124 have different dimensions in a direction between the first surface 121U, 122U, 123U, 124U and the respective second surface.

For instance, in one or more embodiments, scintillator material bodies 121, 122, 123, 124 can be provided having step-wise decreasing lengths corresponding to a desired detection efficiency for different radiation energies.

Moreover, the smallest lengths may contribute to the compensation of unlinearities in the processing of the signals $S_1$, $S_2$, . . . , in the "linearization" processing circuit 15, being a preliminary filter of the interaction depth of the lowest energy radiation particles.

While four scintillator material bodies 121, 122, 123, 124 are illustratively shown in FIG. 5, these bodies can be in any number, the number of four being just an example.

Also, in one or more embodiments, alternative or additional to scintillator material bodies 121, 122, 123, 124 having step-wise decreasing lengths as shown in FIG. 5, one or more scintillator material portions 121, 122, 123, 124 may have lengths and/or material that decrease or vary continuously, for instance with scintillator material portions 121, 122, 123, 124 similar to adjacent regions of a common scintillator material body or an adjacent separate scintillator material body. In one or more embodiments as shown in FIG. 5, the various scintillator material bodies 121, 122, 123, 124 can be juxtaposed by arranging them side-by-side by giving rise to a "columnar" arrangement.

Moreover, each scintillator body in the columnar arrangement in FIG. 5 may be equipped with lateral detectors as shown in FIG. 2 and FIG. 3.

The scintillator bodies may also be arranged in different 3D geometries, for instance one on top of the other instead of adjacent positions, or in spherical instead of planar geometry, depending on the radiation beam geometry.

In one or more embodiments as shown in FIG. 5, each of the bodies 121, 122, 123, 124 may have a respective photoelectric converter, for instance 142, 143, 144—a corresponding converter for the body 121 is not visible in FIG. 5, arranged at an end position, e.g., a back or bottom end, similar to the photoelectric converter 144 of FIG. 3, each one coupled to a respective electronic processing channel.

As shown in dashed lines, an arrangement as shown in FIG. 5 lends itself to the provision of a photon-reflecting casing 2 and/or a filtering case to prevent environmental photons to be detected as discussed previously in connection with FIG. 3.

In arrangements as shown in FIGS. 3 and 5, the photon-reflecting casing 2 applied or formed onto the scintillator material 12, 121, 122, 123, 124 and the associated phoetoelectric converters 141, 142, 143, 144 will counter undesired dispersion of photons so that the photons can be fully captured by the photoelectric converters.

A black resin (for instance a standard package molding compound for semiconductor devices: an epoxy molding compound or EMC may be exemplary of such a compound) may be eventually molded on the resulting structure, possibly including the processing circuitry, in manufacturing the relevant semiconductor devices.

One or more embodiments lend themselves to the simultaneous production of plural devices which can be eventually singulated to provide individual devices for instance in view of subsequent testing.

A device as shown herein (for instance, 10), may comprise:
  scintillator material (for instance, 12; 121, 122, 123, 124) configured to produce light as a result of radiation (for instance, R) interacting with the scintillator material, and
  photoelectric conversion circuitry (for instance, 141, 142, 143, 144) optically coupled to the scintillator material and configured to produce electrical signals (for instance, $S_1$, $S_2$, . . . ) via photoelectric conversion of light produced by the scintillator material,
  wherein the device comprises a plurality of photoelectric converters (for instance, 141, 142, 143, 144) optically coupled with said scintillator material at spatially separated (spatially distinct, for instance) locations, wherein the photoelectric converters in said plurality of photoelectric converters produce respective electrical signals by photoelectric conversion of light produced by the scintillator material as a result of radiation interacting with (propagating in, for instance) the scintillator material (along a plurality of respective propagation paths, for instance).

The scintillator material can be of different thicknesses (for instance, different lengths, as shown in FIG. 5) and/or comprise different materials, for instance, and the radiation may thus interact therewith (propagate therein, for instance) at respective propagation depths and/or in different materials.

For instance, in FIGS. 2 to 4, propagation paths of different lengths are provided extending from the "front" or "top" surface of the body 12 to the photoelectric converters 141, 142, 143, 144 spaced along the sides of the body 12 (and possibly at the bottom thereof: see, for instance, 144 in FIG. 3).

Still for instance, in FIG. 5 propagation paths of different lengths are provided between the "front" or "top" surfaces of the portions (bodies) 121, 122, 123, 124 and the "back" or "bottom" surfaces where the photoelectric converters 141, 142, 143, 144 are arranged.

A device as shown in FIGS. 2 to 4 may comprise at least one body of scintillator material extending, in a longitudinal direction (for instance, X12), wherein the photoelectric converters in said plurality of photoelectric converters may be coupled with said scintillator material at locations spatially separated along said longitudinal direction (X12).

In a device as shown herein, said plurality of photoelectric converters may comprise:
at least one first photoelectric converter, for instance, 144, coupled with said body of scintillator material at an end or a terminal position thereof;
at least one second photoelectric converter, for instance, 141, 142, 143, coupled with said body of scintillator material at a lateral position thereof.

A device as shown in FIG. 5 may comprise a plurality of portions of scintillator material (for instance, as separate bodies 121, 122, 123, 124) configured to produce light as a result of radiation interacting with the scintillator material (for different radiation energies), the portions in said plurality of portions of scintillator material having respective photoelectric converters optically coupled therewith.

In a device as shown in FIG. 5, the portions in said plurality of portions of scintillator material may have respective different thicknesses or lengths, for instance, and/or comprise different scintillator materials, thereby optimizing the detection efficiency for different radiation energies, the portions in said plurality of portions of scintillator material having respective photoelectric converters optically coupled therewith, at an end or a terminal position thereof for instance.

The portions in said plurality of portions of scintillator material may be juxtaposed to one another by being arranged side by side in a columnar arrangement, as shown in FIG. 5, and/or by being arranged in a piled or stacked arrangements or a combination of the two.

In a device as shown herein, said photoelectric converters may comprise silicon photomultipliers or arrays of SPADs of at least one pixel.

A device as shown herein may comprise a casing 2 of photon-reflective material surrounding said scintillator material and said plurality of photoelectric converters.

A device as shown herein may comprise a substrate 18 carrying said scintillator material and said plurality of photoelectric converters as well as signal processing circuitry 15 coupled to said plurality of photoelectric converters and configured to process the electrical signals produced by said plurality of photoelectric converters.

A dosimeter as shown herein may have a sensing surface configured to be exposed to ionizing radiation, the dosimeter comprising a device as shown herein, the device arranged with said scintillator material facing said sensing surface to produce light as a result of ionizing radiation interacting with the scintillator material.

Without prejudice to the underlying principles, the details and embodiments may vary, even significantly, with respect to what has been described by way of example only without departing from the scope of protection.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a substrate;
a parallelepiped shaped scintillator material having a first surface coupled to the substrate, the first surface having a first surface area, a second surface with a second surface area transverse to the first surface and a third surface with a third surface area transverse to the first surface, both the second surface area and the third surface area being greater than the first surface area; and
photoelectric conversion circuitry optically coupled to the scintillator material, the photoelectric conversion circuitry including:
a first plurality of photoelectric converters optically coupled to the scintillator material on the second surface of the scintillator material and completely covering the second surface of the scintillator material;
a second plurality of photoelectric converters optically coupled to the scintillator material on the third surface of the scintillator material and completely covering the third surface of the scintillator material; and
a first isolated photoelectric converter coupled between the first surface of the scintillator material and the substrate.

2. The device of claim 1, wherein the scintillator material includes at least one scintillator body extending in a first direction, and the first plurality of photoelectric converters and the second plurality of photoelectric converters are coupled with the at least one scintillator body at locations spatially separated along the first direction.

3. The device of claim 2, wherein the first isolated photoelectric converter has a first dimension along a second direction transverse to the first direction, the first dimension being smaller than a first distance between the second surface of the scintillator material and the third surface of the scintillator material along the second direction.

4. The device of claim 1, wherein the scintillator material includes a plurality of portions, each of the plurality of portions optically coupled to at least one respective plurality of photoelectric converters of the first and second pluralities of photoelectric converters.

5. The device of claim 4, wherein a first portion and a second portion of the plurality of portions of the scintillator material have different dimensions from one another.

6. The device of claim 4, wherein a first portion and a second portion of the plurality of portions of the scintillator material have different materials from one another.

7. The device of claim 4, wherein the plurality of portions of the scintillator material are juxtaposed to one another.

8. The device of claim 1, wherein the first plurality of photoelectric converters, the second plurality of photoelectric converters, and the first isolated photoelectric converter include one or more silicon photomultipliers or one or more arrays of single-photon avalanche diodes.

9. The device of claim 1, comprising a casing of photon-reflective material surrounding the scintillator material and the first plurality of photoelectric converters, the second plurality of photoelectric converters, and the first isolated photoelectric converter.

10. The device of claim 1, comprising
signal processing circuitry coupled to the first plurality of photoelectric converters, the second plurality of photoelectric converters, and the first isolated photoelectric converter and configured to process the electrical signals produced by the photoelectric conversion circuitry.

11. The device of claim 1, wherein the scintillator material is configured to produce light upon receiving radiation that interacts with the scintillator material; and
wherein the photoelectric conversion circuitry is configured to produce electrical signals via photoelectric conversion of the light produced by the scintillator material.

12. A dosimeter, comprising:
a parallelepiped shaped scintillator body having a first surface configured to receive ionizing radiation;
a second surface opposite to the first surface, the second surface having a first surface area;
a third and fourth surfaces that are transverse to both the first surface and the second surface, the third surface having a second surface area that is greater than the first surface area and the fourth surface having a third surface area that is equal to the second surface area;
a plurality of photoelectric converters optically coupled to the third and fourth surfaces of the scintillator body, each of the third and fourth surfaces including at least two of the plurality of photoelectric converters and each of the third and fourth surfaces being completely covered by the plurality of photoelectric converters.

13. The dosimeter of claim 12, wherein the plurality of photoelectric converters include a first photoelectric converter and a second photoelectric converter, the first photoelectric converter aligned with the second photoelectric converter in a first direction that extends between the first surface and the second surface of the scintillator body.

14. The dosimeter of claim 13, wherein the plurality of photoelectric converters includes a third photoelectric converter that is coupled to the third surface of the scintillator body.

15. The dosimeter of claim 14, wherein the plurality of photoelectric converters includes a fourth photoelectric converter that is coupled to the fourth surface of the scintillator body.

16. The dosimeter of claim 15, wherein the plurality of photoelectric converters includes a fifth photoelectric converter that is between the scintillator body and a substrate.

17. The dosimeter of claim 16, including a second scintillator body that is adjacent to the first scintillator body.

18. A device, comprising:
a substrate;
a first photoelectric converter on the substrate;
a second photoelectric converter on the substrate;
a first parallelepiped shaped scintillator body on the first photoelectric converter, and having a first surface and a second surface opposite to the first surface, the first surface being coupled to the first photoelectric converter and completely covered by the first photoelectric converter; and
a second parallelepiped shaped scintillator body that is distinct from the first scintillator body and on the second photoelectric converter and having a third surface and a fourth surface opposite to the third surface, the third surface being coupled to the second photoelectric converter and completely covered by the second photoelectric converter, the fourth surface being further away from the substrate than the second surface.

19. The device of claim 18, wherein the first scintillator body and the second scintillator body have different dimensions from one another.

20. The device of claim 18, wherein the first and second scintillator bodies have different materials from one another.

* * * * *